(12) United States Patent
Takabayashi et al.

(10) Patent No.: US 6,282,081 B1
(45) Date of Patent: Aug. 28, 2001

(54) ELECTRODE FOR CAPACITOR, METHOD FOR PRODUCING THE SAME AND CAPACITOR

(75) Inventors: Shoko Takabayashi, Ibaraki; Seiichi Asada, Mishima-gun; Toshiyuki Edamoto, Otokuni-gun; Kiyoshi Sato, Suita, all of (JP)

(73) Assignee: Hitachi Maxell, Ltd., Osaka-fu (JP)

( * ) Notice: Subject to any disclaimer, the term of this patent is extended or adjusted under 35 U.S.C. 154(b) by 0 days.

(21) Appl. No.: 09/505,893

(22) Filed: Feb. 17, 2000

(30) Foreign Application Priority Data

Feb. 17, 1999 (JP) .................................................. 11-038764

(51) Int. Cl.$^7$ ...................................................... H01G 9/00
(52) U.S. Cl. ............................ 361/502; 361/511; 361/512

(58) Field of Search .................................. 361/502–503, 361/508, 511–512; 423/44 R

(56) References Cited

U.S. PATENT DOCUMENTS 5,150,283   9/1992   Yoshida et al. ..................... 361/502

FOREIGN PATENT DOCUMENTS 414209   1/1992   (JP) .

*Primary Examiner*—Anthony Dinkins
(74) *Attorney, Agent, or Firm*—Birch, Stewart, Kolasch and Birch, LLP

(57) ABSTRACT

An electrode for a capacitor comprising a collector and a layer of a polarizable electrode material formed thereon, which includes activated carbon powder, a conducting aid, and a mixture of polytetrafluoroethylene and hydroxyalkylcellulose as a binder, which electrode is useful as an electrode of an electric double layer capacitor.

8 Claims, 1 Drawing Sheet

ELECTRODE FOR CAPACITOR, METHOD FOR PRODUCING THE SAME AND CAPACITOR

BACKGROUND OF THE INVENTION

1 Field of the Invention

The present invention relates to an electrode for a capacitor, a method for producing the same, and a capacitor. In particular, the present invention relates to a capacitor having good high-electric current properties and a large capacitance.

2 Prior Art

One example of capacitors having a large capacitance is an electric double layer capacitor. An electric double layer capacitor utilizes the electricity-storage function of the electric double layer formed at an interface between a polarizable electrode and an electrolyte. In general, an electric double layer capacitor comprises a pair of polarizable electrodes (a positive electrode and a negative electrode), a liquid electrolyte impregnated in the electrodes, a porous separator for separating the electrodes, which is impregnated with the liquid electrolyte and ion-permeable, and has an electrical insulation property to prevent the formation of a short circuit, and collectors connected with the respective electrodes.

Recently, it has been tried to use capacitors having a large capacitance as load leveling power sources of secondary batteries for electric vehicles by making use of the high-electric current charging and discharging characteristics of such capacitors. when the capacitors having a large capacitance are used as load leveling power sources, the voltage fluctuation of the secondary batteries is minimized when the vehicles are started or rapidly accelerated, or when the braking energy is recovered. Thus, the life of the secondary batteries is significantly prolonged.

When the capacitors having a large capacity are used as load leveling power sources, a voltage of 240 to 300 V, which is necessary to drive a motor, should be attained. To this end, it is necessary to connect 80 to 120 unit batteries in the case of capacitors using an organic liquid electrolyte, or 300 to 380 unit batteries in the case of capacitors using an aqueous liquid electrode, in series. Thus, the former capacitors using an organic liquid electrolyte are more advantageous than the latter ones using an aqueous liquid electrolyte, because of the smaller number of the unit batteries which are connected in series. However, in the case of organic liquid electrolyte type capacitors having a larger resistance than aqueous liquid electrolyte ones, a film having a high collection efficiency such as an aluminum foil should be used as a collector, and an opposed area of an electrode should be increased by forming a thin layer of a polarizable electrode material (polarizable electrode layer) on such a film, since a current of 50 to 200 A should flow through the capacitors.

When an electrode for such a capacitor is produced, a metal foil, a conductive polymer film or a carbon film is used as a collector, and a layer of a polarizable electrode material comprising activated carbon, a conducting aid and a binder is formed on the collector. To form the layer of the polarizable electrode material, following techniques are known:

a) Polytetrafluoroethylene (PTFE) as a binder, activated carbon powder and a conducting aid are kneaded to obtain a rubbery compound, and the compound is extruded around a mesh type collector such as an expanded aluminum sheet to form the layer of the polarizable electrode material.

b) Polyvinylidene fluoride (PVdF) as a binder, activated carbon powder and a conducting aid are kneaded to obtain a coating composition for forming a layer of a polarizable electrode material, and applying such a composition on a collector such as an aluminum foil.

c) A water-soluble binder (e.g. hydroxymethylcellulose, hydroxyethylcellulose, hydroxypropylcellulose, carboxycellulose, etc.), an activated carbon fiber and a conductive aid are mixed to obtain a coating composition for forming a layer of a polarizable electrode material, and applying the composition on a collector such as an aluminum foil (see JP-A-4-14209)

An electrode having a layer of a polarizable electrode material, which is thinly and uniformly formed on a collector, is preferably used as an electrode for a capacitor having a large capacitance. When such a layer of a polarizable electrode material is formed, it is preferable to use PTFE having good heat resistance and electrochemical stability like in the case of the above a). It is also preferable to prepare a coating composition for the formation of a layer of a polarizable electrode material and then coating such a composition on a collector like in the case of the above b) or c), since the thin and uniform film of the polarizable electrode material can be effectively and easily formed. Thus, it may be possible to effectively form a layer of a polarizable electrode material having good properties, if a thin and uniform layer of a polarizable electrode material is formed by preparing a coating composition for the formation of a layer of a polarizable electrode material using PTFE as a binder, and applying such a coating composition on a collector.

However, PTFE has low thickening and adhesion properties and, therefore, no physical stability necessary for a coating composition is attained, when PTFE is used to prepare such a coating composition. Thus, it has been difficult to prepare a coating composition from a mixture containing PTFE. For this reason, the mixture is used in the form of a compound rather than a coating composition in the above a) . In this case, a mesh type collector such as an expanded aluminum sheet should be used, and thus the thickness of the layer of the polarizable electrode material increases. Therefore, an internal resistance of a capacitor tends to increase, and it may be difficult to attain a large electric current.

On the other hand, the above techniques b) and c) have no problem that arises when PTFE is used, since they use a binder comprising PVdF and a water-soluble binder, respectively, but they cannot use good properties of PTFE such as heat resistance. Furthermore, the above technique b) has some drawbacks such that a capacitor may have a low dielectric strength since N-methylpyrrolidone (NMP), which is used to dissolve PVdF, cannot be completely removed and remains in the liquid electrolyte, and that PVdF is easily decomposed during drying and thus the life of a coating and drying apparatus tends to be shortened, although the thin layer of the polarizable electrode material can be formed on the collector.

SUMMARY OF THE INVENTION

One object of the present invention is to provide an thin and flexible electrode which can be wound in a small diameter, and used as a polarizable electrode suitable for a capacitor having a large capacity.

Another object of the present invention is to provide a method for the production of a thin and flexible electrode, which can be wound in a small diameter, and used as a polarizable electrode suitable for a capacitor having a large capacity, using a chemically stable coating composition having a long pot life and good heat resistance to form a layer of a polarizable electrode material.

A further object of the present invention is to provide a capacitor having a good large-current characteristics comprising a thin and flexible electrode produced by such a method.

To realize an electrode for a capacitor suitable for large-current applications such as load leveling power sources for secondary batteries of electric vehicles or power sources of hybrid automobiles, a binder system which satisfies the following requirements is examined:

1) a thin coated film of a polarizable electrode material can be formed on a collector.
2) the coated film is flexible so that the collector carrying the coated film can be wound in a small diameter.
3) a coating composition comprising the binder system has a long pot life.

From the above viewpoint, a combination of PTFE, which is flexible as a binder of a polarizable electrode material and stable at high temperature, and a water-soluble binder having good heat resistance was examined. In this examination, carboxycellulose, polyvinylpyrrolidone (PVP), hydroxyalkylcellulose, etc. were used as a water-soluble binder to be used in combination with PTFE. When water-soluble binders other than hyroxyalkylcellulose were used, the viscosity of the coating compositions increased as the dispersing time and storage time are prolonged, and no coating composition which can be applied was obtained. Thus, it has been found that an electrode for a capacitor, which satisfies the above requirements, can be obtained when PTFE and hydroxyalkylcellulose are used as binders, and the present invention has been completed.

Firstly, the present invention provides an electrode for a capacitor comprising a collector and a layer of a polarizable electrode material formed thereon, which comprises activated carbon powder, a conducting aid, and a mixture of polytetrafluoroethylene and hydroxyalkylcellulose as a binder.

Secondly, the present invention provides a method for the production of an electrode for a capacitor according to the present invention comprising the steps of dispersing activated carbon powder and a conducting aid in an aqueous medium containing polytetrafluoroethylene and hydroxyalkylcellulose dispersed therein,]

applying such a dispersion on a collector, and drying the applied dispersion.

Thirdly, the present invention provides a capacitor comprising a pair of electrodes each of which comprises a collector and a layer of a polarizable electrode material containing activated carbon powder, a conducting aid and a mixture of polytetrafluoroethylene and hydroxyalkylcellulose as a binder, a separator provided between a pair of the electrodes, an organic liquid electrolyte which is impregnated in the electrodes and the separator, and a container which contains the above elements.

DETAILED DESCRIPTION OF THE INVENTION

Figure 1:
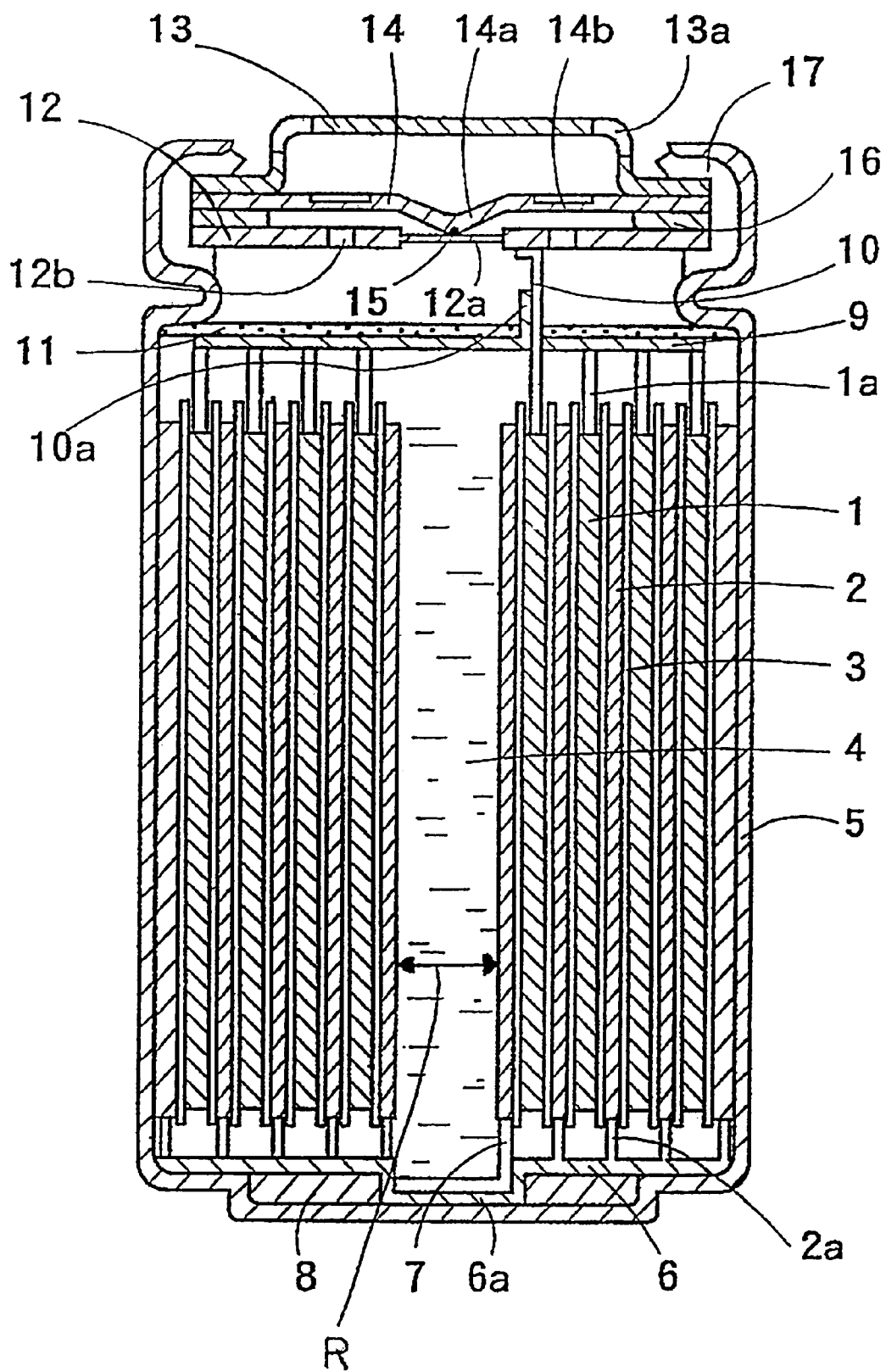
FIG. 1, a schematic cross section of one example of the capacitor (electric double layer capacitor) according to the present invention.

In the electrode of the present invention, the layer of the polarizable electrode material may be carried on one surface or both surfaces of the collector. In either case, the thickness of one layer of the polarizable electrode material is preferably 200 $\mu$m or less, more preferably from 50 to 100 $\mu$m. An aluminum foil is preferably used as a collector, since an internal resistance decreases, and the electrode is made flexible.

Examples of hydroxyalkylcellulose include hydroxymethylcellulose, hydroxyethylcellulose, hydroxypropylcellulose, hydroxypropylmethylcellulose, hydroxyethylmethylcellulose, etc. They may be used singly or in admixture of two or more.

The amount of such hydroxyalkylcellulose is usually from 1 to 50 wt. %, preferably from 2 to 20 wt. % of the weight of activated carbon powder. When the amount of hydroxyalkylcellulose is less than 1 wt. %, the adhesion properties deteriorate. When the amount of hydroxyalkylcellulose exceeds 50 wt. %, the content of activated carbon powder decreases, and thus the capacitance of a capacitor comprising such electrodes decreases.

In the electrode of the present invention, the layer of the polarizable electrode material carried on the collector comprises activated carbon powder, a conducting aid and binders. An electrode containing a conducting aid together with activated carbon powder has a low internal resistance, and thus it is advantageous for use in a capacitor for large current applications.

Examples of the conducting aid include carbon black such as acetylene black, natural and synthetic graphite, kitchen black, carbon fiber, metal powder, metal fiber, etc.

The electrode of the present invention is preferably produced by a method comprising the steps of dispersing activated carbon powder and a conducting aid in an aqueous medium containing polytetrafluoroethylene and hydroxyalkylcellulose dispersed therein to prepare a coating composition, applying the coating composition on a collector, and drying the applied dispersion. Preferably, a small amount of an alcohol is added to the coating composition, since the flowability of the coating composition is improved. When the amount of the alcohol is too small, the flowability of the coating composition may not be improved, while when the amount of the alcohol is too large, the flowability of the coating composition increases too much so that the composition may sag in the course of application. Thus, the amount of the alcohol is preferably from 1 to 50 wt. %, more preferably from 1 to 10 wt. % of the total amount of polytetrafluoroethylene and hydroxyalkylcellulose.

While the present invention may be applied to a capacitor in which plate-type electrodes are laminated, it can be effectively applied to a capacitor in which electrodes are wound in a small diameter and then installed in a metal can.

The coating composition used in the present invention has high flowability, and coated thinly on a collector. Thus, the present invention is advantageous when a layer of a polarizable electrode material having a thickness of 200 $\mu$m or less is formed.

The capacitor of the present invention comprises the electrodes of the present invention. That is, the capacitor of the present invention comprises a pair of electrodes each of which comprises a collector and a layer of a polarizable electrode material containing activated carbon powder, a conducting aid and a mixture of polytetrafluoroethylene and hydroxyalkylcellulose as a binder, a separator provided between a pair of the electrodes, an organic liquid electrolyte which is impregnated in the electrodes and the separator, and a container which contains the above elements. In such a capacitor, it is preferably to wound a pair of electrodes in a small diameter with inserting a separator between them, since the electrodes are flexible as explained above, so that they can be wound in a small diameter. Such a wound type capacitor can have a large capacitance per unit volume, since a large electrode area can be supplied.

A separator may be a thin film of, for example, cellulose, polypropylene, polyethylene, etc.

Examples of a liquid electrode include solutions of electrolytes each comprising a cation (e.g. quaternary ammonium ion, quaternary phosphonium ion, etc.), and an anion (e.g. tetrafluoroborate ion, hexafluorophosphate ion, etc.) dissolved in a solvent (e.g. propylene carbonate, β-butyrolactone, trimethyl phosphate, etc.).

The present invention will be explained in detail by making reference to the accompanying drawing.

The present invention can be applied to an electric double layer capacitor, which is shown in FIG. 1.

The capacitor of FIG. 1 has the sheet form positive electrode 1 and the sheet form negative electrode 2, each of which consists of the electrode of the present invention. In FIG. 1, the components of the positive and negative electrodes 1, 2 such as a layer of a polarizable electrode material and a collector are not separately depicted to avoid the complexity, while the exposed part of the collector, which provides a conducting member, is depicted. The exposed part 1a of the collector of the positive electrode 1 extends beyond the upper end of the separator 3, and the tip end of the exposed part 1a is in contact with the collector plate 9 for the negative electrode, while the exposed part 2a of the collector of the negative electrode 2 extends beyond the lower end of the separator 3 and the tip end of the exposed part 2a is in contact with the collector plate 6 for the negative electrode. The positive and negative electrodes 1, 2 are spirally wound with inserting the separator 3 between them, and. contained in the container 5 as an electrode body having a spirally wound structure, together with a liquid electrolyte. The symbol "R" indicates the innermost diameter of the spirally wound electrode body. According to the present invention, a spirally wound electrode body can be produced without the exfoliation of the layer of the polarizable electrode material, even when the innermost diameter of the wound electrode is 5 mm or less.

The container 5 may be made of an iron plated with nickel, and functions also as a negative electrode terminal. At the bottom of the container 5, the collector plate 6 for the negative electrode, which is made of a nickel mesh, is welded prior to the insertion of the electrode body. The symbol "6a" indicates the welded part. The metal ring 8 is provided on the bottom of the container 5 to avoid the slack of the collector plate 6. Furthermore, the nickel lead member 7 for the negative electrode 2 is welded to the collector plate 6.

The collector plate 9 for the positive electrode, which is made of an aluminum mesh, is placed on the upper end of the spirally wound electrode body, and an aluminum lead member 10 is welded to the collector plate 9. The symbol "10a" indicates the welded part. The lead member 10 is shown in the straight form, but it is actually elbowed after it is connected to the sealing plate 12 with supersonic. The polypropylene insulating plate 11 is placed on the upper side of the collector plate 9, and the insulating plate 11 has a hole near its center for pouring the liquid electrode and drawing out of the lead member 10.

The sealing lid comprises the sealing plate 12, the terminal plate 13, the explosion-proof valve 14, the welded part 15, and the insulation packing 16.

The sealing plate 12 consists of an aluminum disk, and has he thin-walled part 12a at its center, and also a hole as the pressure-introduction hole 12b around the thin-walled part 12a to apply an internal pressure to the explosion-proof valve 14. The projected part 14a of the explosion-proof valve 14 is welded to the upper side of the thin-walled part 12a of the sealing plate 12 to form the welded part 15.

The terminal plate 13 is made of a nickel-plated rolled steel, and has the gas-outlet hole 13a.

The explosion-proof valve 14 consists of an aluminum disk, and has the downwardly projected part 14a at its center as shown in FIG. 1, and also the thin-walled part 14b around the projected part 14a. The lower tip end of the projected part 14a is welded to the upper side of the thin-walled part 12a of the sealing plate 12 to form the welded part 15.

The insulation packing 16 consists of a propylene ring, and is placed on the periphery of the sealing plate 12. Thus, the insulation packing 16 insulates the sealing plate 12 from the explosion-proof valve 14, and seals the gap between them to prevent the leakage of the liquid electrolyte through the gap.

The annular gasket 17 is made of polypropylene, and insulates the container 5, which also functions as the negative electrode terminal, from the terminal plate 13 functioning as the positive electrode terminal, the sealing plate 12, the explosion-proof valve 14, etc.

EXAMPLES

The present invention will be illustrated by the following examples, in which the present invention is applied to an electric double layer capacitor.

Example 1

Activated carbon powder (32 wt. parts), acetylene black (8 wt. parts) as a conducting aid, polytetrafluoroethylene (3 wt. parts) and hydroxypropylcellulose (3 wt. parts) as binders, and water (150 wt. parts) as a medium were compounded and mixed to prepare a coating composition for a layer of a polarizable electrode material.

Then, the coating composition was uniformly coated in the layer form on the both surfaces of an aluminum foil having a thickness of 20 μm as a collector. The coated amount was 5.5 mg/cm$^2$ on each surface. The coated collector was then dried on a plate heated at 120° C. for 30 minutes to remove water. Furthermore, the dried coated collector was compressed with a roll press and cut to obtain an electrode having a determined size (500 mm×55 mm). In this way, an electrode was obtained, which consists of the collector, and the layers of the polarizable electrode materials carried on both surfaces of the collector and consisting of the mixture of activated carbon, the conducting aid (acetylene black), and the binders (polytetrafluoroethylene and hydroxypropylcellulose). The thickness of each layer of the polarizable electrode material was 80 μm.

Two electrodes, which were produced as described above, were used as positive and negative electrodes, and an aluminum lead member (Al ribbon) and a nickel lead member (Ni ribbon) were welded to the positive and negative electrodes, respectively.

Then, the positive and negative electrodes were spirally wound with inserting a paper separator between them to form a spirally wound electrode body, and inserted in a negative electrode can made of a nickel-plated iron. Thereafter, an organic liquid electrolyte consisting of propylene carbonate as a solvent and tetraethylammonium tetrafluoroborate as an electrolyte dissolved therein was poured in the can, and then the opening of the can was sealed to obtain the capacitor of Example 1.

Comparative Example 1

A capacitor of Comparative Example 1 was produced in the same manner as in Example 1 except that carboxymethylcellulose was used in place of hydroxypropylcellulose.

Comparative Example 2

A capacitor of Comparative Example 2 was produced in the same manner as in Example 1 except that polyvinylpyrrolidone was used in place of hydroxypropylcellulose.
Evaluations With the capacitors produced in Example 1 and Comparative Examples 1 and 2, the properties of the coating compositions for the formation of the layers of the polarizable electrode material, and the properties of the electrodes were examined. The examined properties included the formation of solid particles in the coating composition and the state of the composition after the storage of the composition for 3 days with respect to the coating compositions, and the defoliation of the layer of the polarizable electrode material from the surface of the collector when the coated collector was compressed with a roll press prior to the cutting in the determined size and when the electrode was spirally wound with respect to the electrodes.

The results are shown in the Table. Table

|  | Properties of coating composition | | Properties of electrode | |
| --- | --- | --- | --- | --- |
|  | Formation of solid particles | State after 3 day storage | Defoliation on compressing | Defoliation on spirally winding |
| Ex. 1 | No | No change | No | No |
| C. Ex. 1 | Yes | No change | Yes | Yes |
| C. Ex. 2 | No | Separation | No | No |

As can be understood from the results in the Table, the solid particles formed in the coating composition for the layer of the polarizable electrode material prepared using polytetrafluoroethylene and carboxymethylcellulose as the binders in Comparative Example 1, and the layer of the polarizable electrode material formed from such a coating composition was peeled off from the surface of the collector when the electrode was compressed and wound.

In the case of Comparative Example 2 in which polytetrafluoroethylene and polyvinylpyrrolidone were used as the binders, the coating composition was separated after being stored for 3 days. That is, the coating composition had a short pot life.

In contrast with Comparative Examples 1 and 2, in the case of Example 1 in which polytetrafluoroethylene and hydroxypropylcellulose were used as the binders, the coating composition and also the electrode had good properties.

Accordingly, the present invention can provide a thin and flexible electrode, in which the layer of the polarizable electrode material is not peeled off from the surface of the collector on compressing or on spirally winding.

Thus, the electrode of the present invention can be spirally wound and provide a capacitor which can be charged and discharged with a large current. Such a capacitor is suitable as, for example, a load leveling power source for electric vehicles.

What is claimed is:

1. An electrode for a capacitor comprising a collector and a layer of a polarizable electrode material formed thereon, which comprises activated carbon powder, a conducting aid, and a mixture of polytetrafluoroethylene and hydroxyalkylcellulose as a binder.

2. The electrode according to claim 1, wherein a thickness of said layer of the polarizable electrode material is 200 µm or less.

3. The electrode according to claim 1, wherein said hydroxyalkylcellulose is at least one hydroxyalkylcellulose selected from the group consisting of hydroxymethylcellulose, hydroxyethylcellulose, hydroxypropylcellulose, hydroxypropylmethylcellulose and hydroxyethylmethylcellulose, and the content of said hydroxyalkylcellulose is from 1 to 50% by weight of said activated carbon powder.

4. The electrode according to claim 1, wherein said collector consists of an aluminum foil.

5. A method for the production of an electrode for a capacitor as claimed in claim 1 comprising the steps of:

dispersing activated carbon powder and a conducting aid in an aqueous medium containing polytetrafluoroethylene and hydroxyalkylcellulose dispersed therein, applying such a dispersion on a collector, and drying the applied dispersion.

6. The method according to claim 5, wherein said aqueous medium further contains 1 to 50% by weight of an alcohol based on the total weight of polytetrafluoroethylene and hydroxyalkylcellulose.

7. A capacitor comprising a pair of electrodes each of which comprises a collector and a layer of a polarizable electrode material containing activated carbon powder, a conducting aid and a mixture of polytetrafluoroethylene and hydroxyalkylcellulose as a binder, a separator provided between a pair of the electrodes, an organic liquid electrolyte which is impregnated in the electrodes and the separator, and a container which contains the above elements.

8. The capacitor according to claim 7, wherein said pair of electrodes are wound with inserting a separator between them.

* * * * *